No. 892,730. PATENTED JULY 7, 1908.
O. F. IMMELL.
FISH HOOK RELEASER.
APPLICATION FILED APR. 24, 1908.
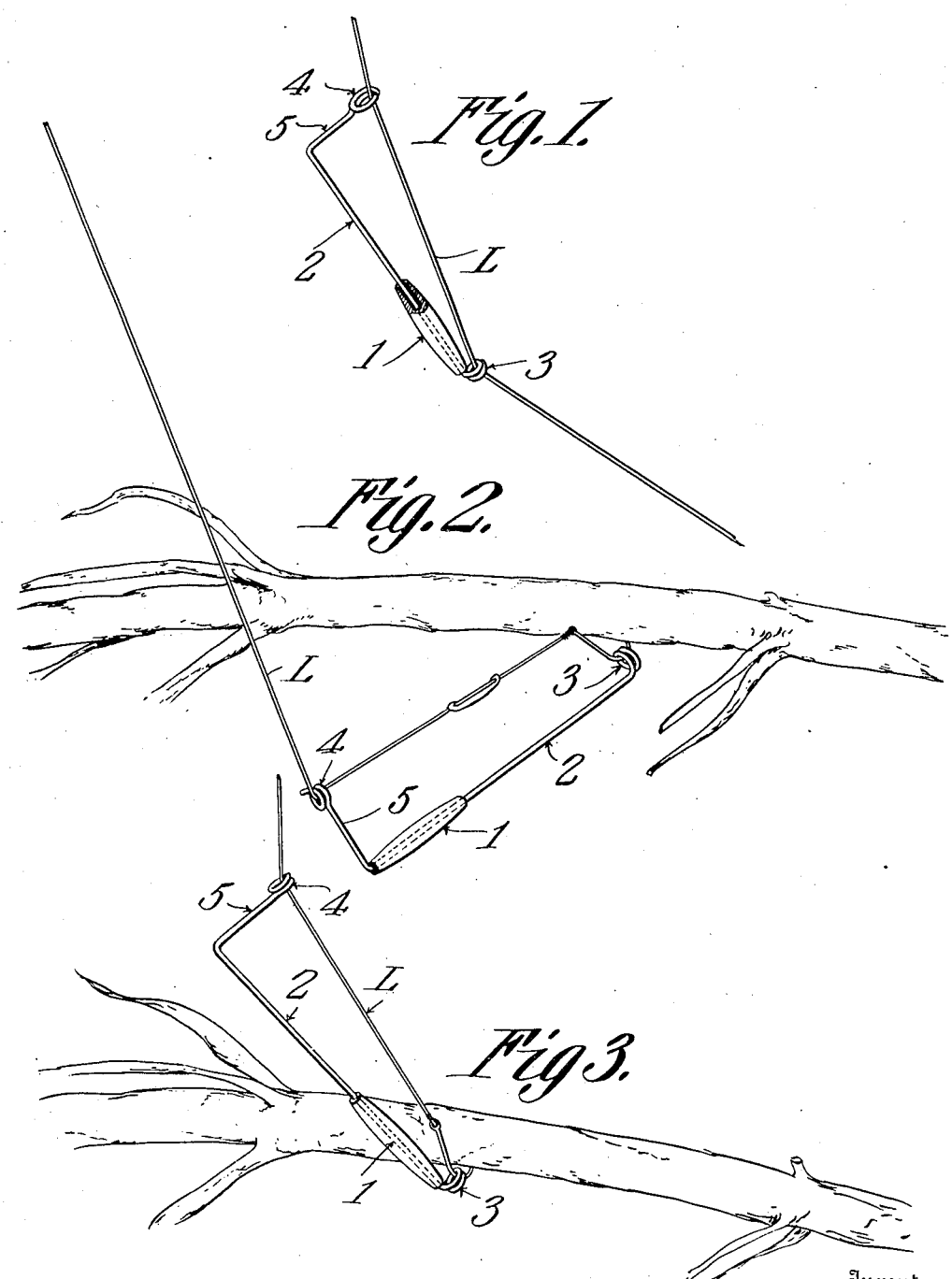
Witnesses
E. W. Stuart
R. M. Elliott
Inventor
Omer F. Immell.
By C. A. Snow & Co.
Attorneys

UNITED STATES PATENT OFFICE.

OMER F. IMMELL, OF BLAIR, WISCONSIN.

FISH-HOOK RELEASER.

No. 892,730.              Specification of Letters Patent.              Patented July 7, 1908.

Application filed April 24, 1908. Serial No. 429,062.

*To all whom it may concern:*

Be it known that I, OMER F. IMMELL, a citizen of the Unites States, residing at Blair, in the county of Trempealeau and State of Wisconsin, have invented a new and useful Fish-Hook Releaser, of which the following is a specification.

This invention relates to fish hook releasers.

As is well known, all anglers experience the annoyance of having their fishing hooks snagged or caught in sunken limbs of trees that frequently abound in shallow streams. Ordinarily, if a hook becomes set, there is no way of detaching it, and the only thing to do is to break the line, not only entailing the loss of the hook and sinker, but frequently a long length of the line.

It is the object of the present invention to provide a novel, cheap and thoroughly efficient device which may readily be assembled with a line without detaching it from the pole, and which, in use, shall be practically positive in detaching a hook that is snagged either in the limb of a sunken tree, or in brush of any kind, or that is caught upon a projecting rock.

With the above and other objects in view, as will appear as the nature of the invention is better understood, the same consists, generally stated, in a fish hook releaser comprising an impact member and a guide, the two being movable in unison or independently of each other, and the guide being provided with means for ready connection with or disconnection from the line.

The invention consists further, and more specifically stated, in a fish hook releaser comprising a length of wire having a weight or impact member slidably mounted thereon, the terminals of the wire being bent at right angles to its length and formed into coiled line engaging eyes.

The invention consists further in the various novel details of construction and combination of parts of a fish hook releaser, as will be hereinafter fully described and claimed.

In the accompanying drawings forming a part of this specification, and in which like characters of reference indicate corresponding parts, Figure 1 is a view in side elevation displaying the attachment as it appears when running down the line toward the hook. Fig 2 is a similar view showing the first step in the operation of releasing the hook. Fig. 3 is a similar view showing the second step of the releasing operation.

As shown in Fig. 1, the device comprises an impact member 1, and a guide 2 therefor, the latter being provided at each end with an offset line-engaging eye 3 and 4, respectively, which, as here shown, are in the form of coils in order to enable the device to be assembled with a fishing line without detaching the latter from the pole, as it will be seen that the line may readily be drawn in between the whirls of the eyes.

The impact member or weight 1 may be made of any suitable material, preferably one that is non-oxidizable, such as brass, or, if preferred, lead may be employed, and is mounted to slide freely upon the guide, but is limited in its movements and is held against disconnection by the eyes 3 and 4.

As will be seen by reference to Fig. 1, the eye 3 is only offset a short distance from the intermediate portion of the guide, while the eye 4 is carried by an angular extension 5. The object of this arrangement is twofold, the first being to prevent any interference between the weight and the line L, and the second being to cause the force of the blow to be as close to the barb or bend of the hook as possible, thereby to insure unsnagging.

In the use of the device, and after a hook has become snagged either upon a limb of a tree, as shown in Figs. 2 and 3, or upon a projecting rock, the attachment is assembled with the line, with the eye 3 projecting toward the hook. The device will slide down the line and the eye 3 will pass over the hook and settle upon the bend thereof adjacent to the barb, as shown in Fig. 2. The angler now allows the line to sink, whereupon the weight will cause the device to assume the position shown in Fig. 2, and upon the line being drawn up, the weight will slide down upon the guide and strike the eye 3. This operation need only be repeated ordinarily two or three times to effect the release of the hook. When released, the hook is drawn from the water and the device is then removed from the line.

It will be seen from the foregoing description that although the improvements herein defined are simple in character, they will be thoroughly efficient for the purposes designed and will prove of great value to anglers, more particularly to those fishing in comparatively shallow streams bounded by woods.

It is to be understood that the eyes 3 and 4 will be of a size to pass over the sinker.

I claim:—

1. A fish hook releaser comprising an impact member and a guide, the two being movable relatively to each other.

2. A fish hook releaser comprising an impact member and a guide, the two being movable in unison or independently of each other.

3. A fish hook releaser comprising an impact member, and a guide slidably assembled therewith and provided with line engaging means.

4. A fish hook releaser comprising an impact member, and a guide provided with coiled line-engaging eyes.

5. A fish hook releaser comprising an impact member, and a guide provided with laterally offset line-engaging eyes.

6. A fish hook releaser comprising an impact member, and a guide provided with laterally offset coiled line engaging eyes.

7. A fish hook releaser comprising an impact member, and a guide provided with line-engaging eyes offset at different distances from the intermediate portion of the guide.

8. A fish hook releaser comprising an impact member, and a guide provided with terminal line engaging eyes offset at different distances from the intermediate portion of the guide.

9. A fish hook releaser comprising an impact member, and a guide slidably assembled therewith, the terminals of the guide being offset at approximately right angles to its intermediate portion and formed into coiled line-engaging eyes.

In testimony that I claim the foregoing as my own, I have hereto affixed my signature in the presence of two witnesses.

OMER F. IMMELL

Witnesses:
SNYDER STOUT,
S. S. URBERG.